United States Patent
Pedersen

(10) Patent No.: US 8,306,695 B2
(45) Date of Patent: Nov. 6, 2012

(54) VEHICLE FOR TRANSPORTING A WIND TURBINE BLADE, A CONTROL SYSTEM AND A METHOD FOR TRANSPORTING A WIND TURBINE BLADE

(75) Inventor: Gunnar Kamp Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 588 days.

(21) Appl. No.: 12/305,853

(22) PCT Filed: Jun. 20, 2007

(86) PCT No.: PCT/DK2007/000302
§ 371 (c)(1),
(2), (4) Date: Apr. 14, 2009

(87) PCT Pub. No.: WO2007/147413
PCT Pub. Date: Dec. 27, 2007

(65) Prior Publication Data
US 2010/0168960 A1    Jul. 1, 2010

(30) Foreign Application Priority Data
Jun. 20, 2006  (DK) .................................. 2006 00838

(51) Int. Cl.
*B66F 7/00* (2006.01)
(52) U.S. Cl. ............... 701/38; 414/639; 410/44; 410/45
(58) Field of Classification Search .................... 701/38; 414/639; 410/44, 45
See application file for complete search history.

(56) References Cited

U.S. PATENT DOCUMENTS

| | | | | |
|---|---|---|---|---|
| 3,160,289 | A * | 12/1964 | Leefer | 414/679 |
| 6,612,601 | B1 * | 9/2003 | Granlind | 280/414.1 |
| 6,808,191 | B1 * | 10/2004 | Buhl et al. | 280/124.107 |
| 7,918,633 | B2 * | 4/2011 | Llorente Gonzalez | 410/45 |
| 2005/0031431 | A1 * | 2/2005 | Wobben | 410/45 |
| 2006/0113449 | A1 * | 6/2006 | Nies | 248/282.1 |
| 2006/0144741 | A1 * | 7/2006 | Wobben | 206/477 |
| 2006/0251517 | A1 * | 11/2006 | Grabau | 416/202 |
| 2006/0285937 | A1 * | 12/2006 | Wobben | 410/45 |

(Continued)

FOREIGN PATENT DOCUMENTS

EP    1 659 026    5/2006

(Continued)

OTHER PUBLICATIONS

Author Unknown, Article entitled "Gipfelsturmer," Nov. 2005, pp. 22-24, Kran- & Schwertansportmagazin.

(Continued)

*Primary Examiner* — Joseph Rocca
*Assistant Examiner* — Barry Gooden, Jr.
(74) *Attorney, Agent, or Firm* — Wood, Herron & Evans, LLP

(57) ABSTRACT

A vehicle for transporting a wind turbine blade. The vehicle comprises a blade connection device for connecting a first end of the blade to the vehicle, wherein the blade connection device comprise a tilting device for elevating an opposite end of the blade and wherein a tip end of the blade is orientated in a forward direction of the vehicle. A control system for controlling the tilting device of a vehicle and a method for transporting a wind turbine blade are also disclosed.

25 Claims, 7 Drawing Sheets

U.S. PATENT DOCUMENTS

| | | | |
|---|---|---|---|
| 2007/0177954 A1* | 8/2007 | Kootstra et al. | 410/44 |
| 2007/0189895 A1* | 8/2007 | Kootstra et al. | 416/9 |
| 2007/0248431 A1* | 10/2007 | Jensen | 410/45 |
| 2007/0253829 A1* | 11/2007 | Wessel et al. | 416/244 R |
| 2008/0246241 A1* | 10/2008 | Mollhagen | 280/124.106 |
| 2009/0274529 A1* | 11/2009 | Broderick et al. | 410/45 |
| 2010/0168960 A1* | 7/2010 | Pederson | 701/38 |
| 2010/0236161 A1* | 9/2010 | Livingston et al. | 52/125.2 |
| 2010/0252977 A1* | 10/2010 | Jorgensen et al. | 269/287 |
| 2010/0275695 A1* | 11/2010 | Cotrell et al. | 73/663 |
| 2010/0310379 A1* | 12/2010 | Livingston | 416/229 R |
| 2011/0031292 A1* | 2/2011 | Krogh et al. | 224/553 |

FOREIGN PATENT DOCUMENTS

| | | |
|---|---|---|
| JP | 2004243805 | 9/2004 |
| WO | WO 99/17989 | 4/1999 |
| WO | WO 2006/000230 | 1/2006 |

OTHER PUBLICATIONS

Hans Winkelmeier, Article entitled "Tauernwindpark Oberzeiring," p. 45, Feb. 2004, DEWI Magazin.

Author Unknown, Article entitled "International Cranes and Specialized Transport," p. 25, Feb. 2006, The Magazine for Equipment Users and Buyers.

* cited by examiner

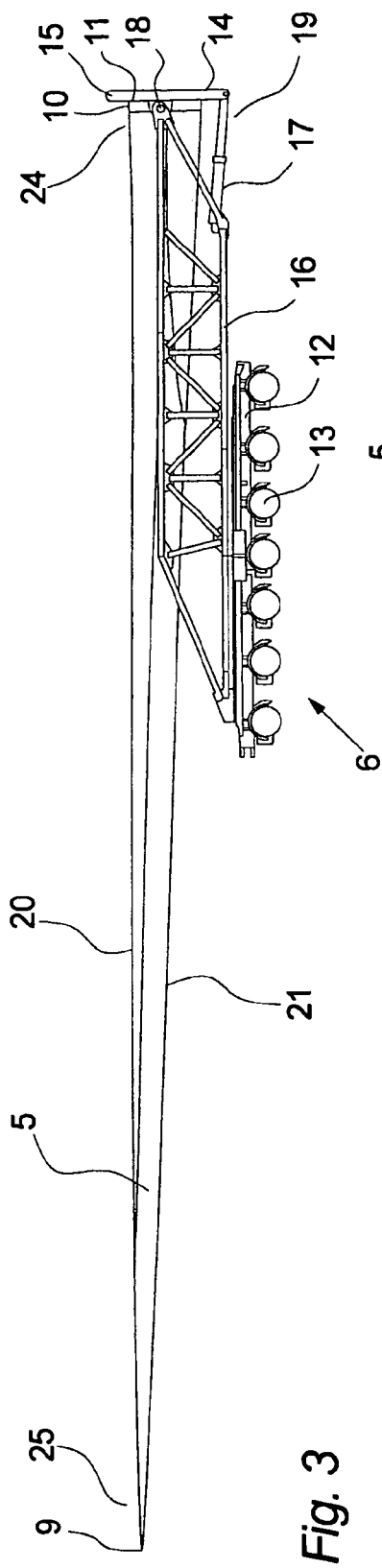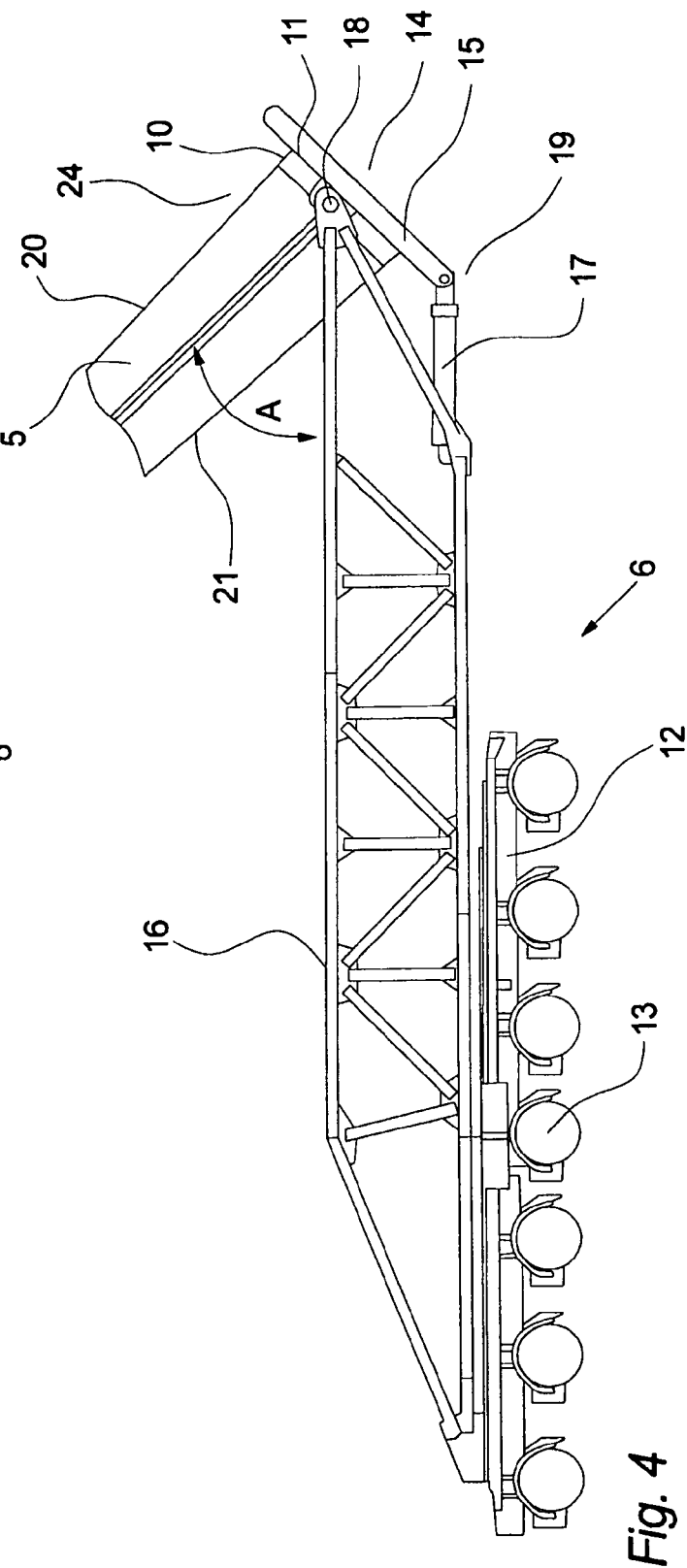
Fig. 3
Fig. 4

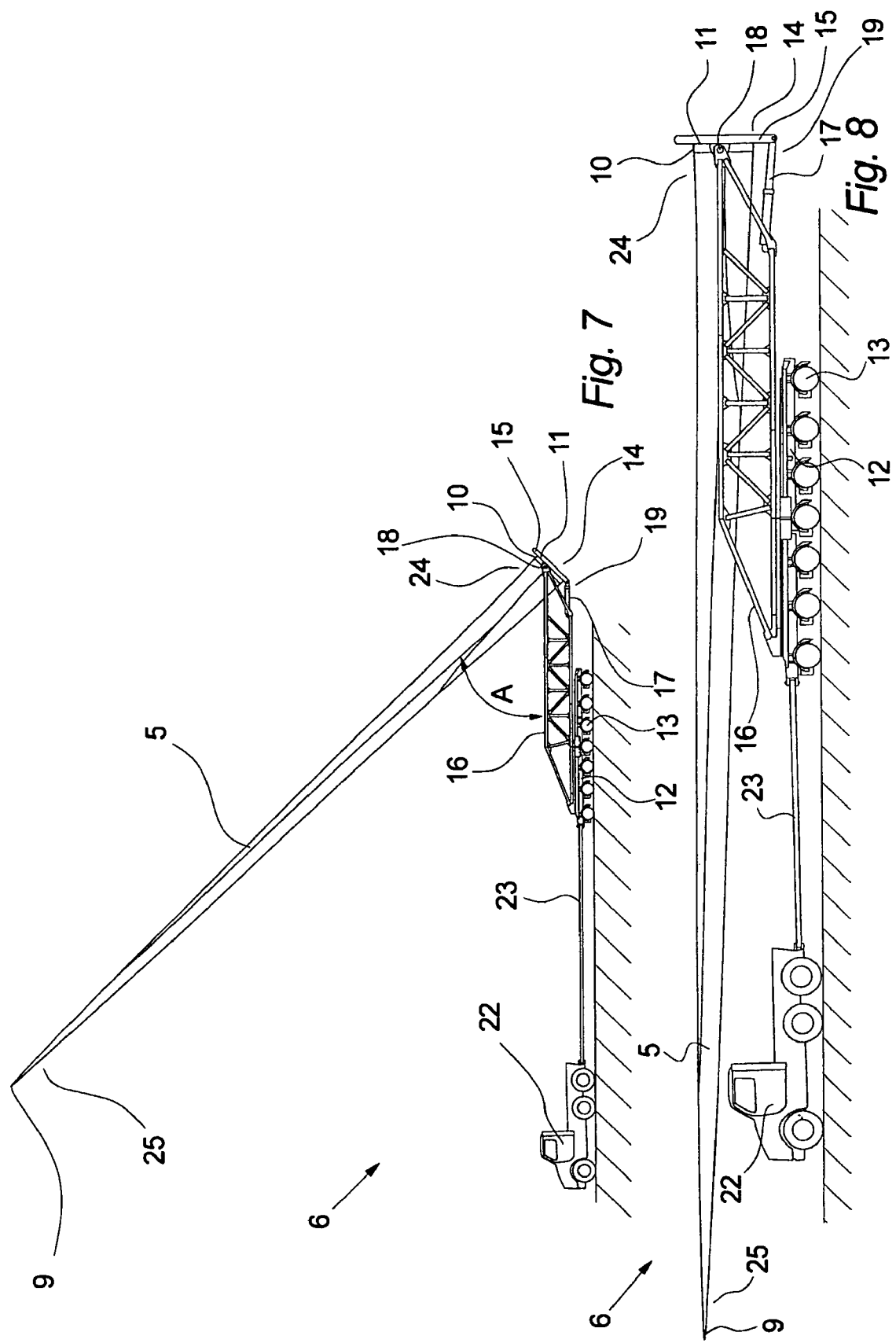

VEHICLE FOR TRANSPORTING A WIND TURBINE BLADE, A CONTROL SYSTEM AND A METHOD FOR TRANSPORTING A WIND TURBINE BLADE

PRIORITY CLAIM

This is a U.S. national stage of application No. PCT/DK2007/000302, filed on Jun. 20, 2007. Priority is claimed on the following application(s): Country: Denmark, Application No.: PA200600838, Filed: Jun. 20, 2006, the content of which is incorporated here by reference.

BACKGROUND OF THE INVENTION

The invention relates to a vehicle for transporting a wind turbine blade, a control system and a method for transporting a wind turbine blade.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Modern wind turbines are constantly optimize and redesigned to increase the power output and an obvious way to increase the output is to increase the size of the wind turbine. But the bigger the different parts of the wind turbine are, the more difficult they are to transport—especially on smaller roads—and the bigger the wind turbines are, the more remote they have to be sited.

This is of course a problem and particularly regarding the wind turbine blades this problem is pronounced, in that unlike e.g. the tower, the blades can not be divided into sections during transport and then assembled at the erection site without it affecting their efficiency and/or flexibility.

One way of solving the problem of transporting long wind turbine blades on relatively small roads or in difficult terrain, is disclosed in International patent application No WO 2006/000230. This application discloses a method for transporting blades, where the blade is suspended in both ends between a tractive vehicle and a non-tractive vehicle. Both the tractive vehicle and the non-tractive vehicle comprise means for height adjusting the blade, hereby making it possible to raise the blade over e.g. small road signs when going through a road bend and lowering the blade e.g. when going under a bridge. But because the height adjusting can only be done within a limited range, this method will only work when passing minor obstacles. If the obstacles e.g. in a road bend are large trees, crags or houses or if the terrain is very undulating, this method will soon meet its limitations.

It is therefore also known in the art to use helicopters to transport the blades, when the roads or the terrain makes is impossible to transport them otherwise. But a helicopter large enough to lift and transport e.g. a 50 m long wind turbine blade is very expensive and the risk of the blade or personnel being damaged during landing or takeoff is significant.

From JP 2004-243805 it is known to transport elongated devices by connecting one end of the device to the back of a truck and make the other end extend freely backward. The device can then be tilted to elevate the free end of the device when the vehicle passes corners. However to ensure that the vehicle does not tilt under the influence of the weight of the device the vehicle either has to be long or heavy which in both cases is disadvantageous.

An object of the invention is to provide for a technique for transporting wind turbine blades without the above mentioned disadvantages.

Especially it is an object of the invention to provide for an advantageous technique for transporting wind turbine blades in terrain, which is difficult to pass.

SUMMARY OF THE INVENTION

A vehicle is provided for transporting a wind turbine blade. The vehicle comprises blade connection means for connecting a first end of the blade to the vehicle, wherein the blade connection means comprise tilting means for elevating an opposite end of the blade and wherein a tip end of the blade is orientated in a forward direction of said vehicle.

When transporting e.g. an 50 meter long and 20 ton heavy wind turbine blade, it is of course advantageous to keep the blade as close to the ground as possible, both to keep the blades centre of gravity as close to the ground as possible to ensure stability but also to ensure, that the blade can pass under bridges, high-voltage wires and the like. But a long wind turbine blade transported close to and approximately parallel with the ground can be virtually impossible to negotiate through a narrow curve on the road, particularly if there are obstacles such as rocks, houses, trees or other on one or both sides of the curve. It is therefore advantageous to provide a blade transporting vehicle with means for tilting the blade, in that when the blade is tilted—making it extend in an angle e.g. of 45° into the air—the length of the blade projected onto the ground is reduced and most of the blade is raised so high that it can pass over the obstacles.

The unsuspended end of the blade can then be lowered again after passing the obstacle to increase the stability of the vehicle.

Furthermore by orientating the tip end of the blade in the forward direction of the vehicle the blade can be arranged to extend beyond a truck propelling the vehicle hereby reducing the total length of the vehicle. Furthermore it is easier to negotiate a difficult turn when the tip is pointing forward, in that is easier to track the tip position when it is pointing in the direction of travel and because the path of the tip then substantially always will be the same as the vehicles i.e. the "obstacle-free" road ahead.

It should be emphasized that by the term "a forward direction of said vehicle" is to be understood the front end of the vehicle or in other words the direction of the normal direction of travel when the vehicle is travelling forward straight ahead.

In an aspect of the invention, said first end is a root end of said blade and said opposite end is a tip end of said blade.

The blade is—when mounted on a wind turbine—attached at the root of the blade, making the tip of the blade extend freely outwards and the blade is therefore designed to withstand the strain of being suspended in only the root end of the blade. It is therefore advantageous to connect the root end of the blade to the blade connection means and elevate the free tip end of the blade.

In an aspect of the invention, said tilting means is capable of tilting said blade in an angle of between 0° and 90°, preferably between 0 and 70°, and most preferred between 0 and 50°.

If the tilting angle of the blade is too little, the blade will not be able to pass high obstacles and if the angle is too big the tilting means could be difficult to design and expensive to manufacture and the stability of the vehicle could be severely compromised. The present angle ranges therefore represents an advantageous relation between functionality, economy and stability.

In an aspect of the invention, said vehicle comprises levelling means.

A relatively small bump in the ground can potentially have a great effect on a long blade extending unsupported e.g. 45° into the air and if the vehicles (including the blade) centre of gravity at any time is moved outside the area on which the vehicle is supported on the ground the vehicle will overturn. It is therefore advantageous to provide the vehicle with levelling means, which at least to a certain degree can compensate for irregularities of the surface of the ground.

In an aspect of the invention, said vehicle is self-propelled.

Hereby is archived an advantageous embodiment of the invention

In an aspect of the invention, said vehicle comprises steering means for steering said vehicle.

Hereby is archived a further advantageous embodiment of the invention

In an aspect of the invention, said blade connection means comprise means for attaching said blade by means of a mounting flange at the root end of said blade.

The mounting flange of the blade is designed to transfer the tremendous torque that the wind-load on the blade creates, besides being able to carry the weight of the entire blade. It is therefore advantageous to make the blade connection means comprise means for attaching the blade at the mounting flange.

In an aspect of the invention, said blade is connected to said blade connection means by way of a plurality of bolts.

The mounting flange of the blade is on most modern wind turbines provided a multitude of threaded sockets embedded in the blade structure for use when mounting the blade on the wind turbine hub by means of bolts. It is therefore advantageous to bolt the blade to the blade connection means.

In an aspect of the invention, said blade connection means comprise means for attaching said blade with a pressure side or a leeward side of said blade facing down.

A vehicle according to the invention would by nature be longer than it would be wide. A wind turbine blade is by nature far more flexible in the direction between the pressure side and the leeward side, than it is in the direction between the leading edge and the trailing edge. It is therefore advantageous to make the pressure side or the leeward side of blade face down, particularly when transporting the blade in an erected position, in that the direction where the blade is most flexible and thereby most instable is then the same direction as the direction where the vehicle has its larges extend and thereby is the most stable.

In an aspect of the invention, said tilting means comprise one or more tilting actuators such as one or more hydraulic cylinders, which is advantageous, in that tilting actuators and hydraulic cylinders in particular are relatively simple, inexpensive and well proven means for tilting large objects such as wind turbine blades.

In an aspect of the invention, the centre of rotation of said tilting means are placed at said first end of said blade.

If the centre of rotation of the tilting means are placed to far up the blade the vehicle would have to be relatively high (and thereby more expensive and unstable), in that the first end of the blade would move downwards if the opposite end was elevated. If the centre of rotation was placed above, bellow or behind the first end of the blade the design of the vehicle or the vehicles load carrying structure would have to be relatively complex a therefore more expensive. It is therefore advantageous to place the tilting means centre of rotation at or at least in close proximity of the first end of the blade.

The invention further provides for a control system for controlling the tilting means of a vehicle according to any of claims 1 to 11, wherein said tilting means are controlled in response to sensor inputs from said vehicle.

A vehicle comprising a very long wind turbine blade being only suspended in one end and the free end of the blade extending e.g. 45° into the air, could under certain circumstances be very difficult to control, particularly if the blade starts to vibrate close to its own natural frequency. It could therefore be advantageous to provide the vehicle with a control system, which automatically and on the basis of one or more sensor inputs from sensors on the blade or on the vehicle, could control the tilting means e.g. by providing countermotion to dampen vibrations in the blade or even oscillations of the entire vehicle.

Even further the invention provides for a method for transporting a wind turbine blade on a vehicle according to any of claims 1 to 11. The method comprises the steps of
connecting a first end of the blade to said vehicle by blade connection means, and
elevating an opposite end of the blade by tilting means of the blade connection means.

By connecting one end of the blade to blade connection means and then elevate the other unsuspended end of the blade by way of tilting means comprised by and acting on the blade connection means is advantageous, in that it hereby is possible to transport blades in undulating terrain and through relatively sharp turns.

BRIEF DESCRIPTION OF THE DRAWINGS

In the Figures be described in the following with reference to the figures in which FIG. 3 illustrates an embodiment of a vehicle comprising a wind turbine blade in a substantially horizontal position, as seen from the side, FIG. 4 illustrates the same embodiment of a vehicle as illustrated in FIG. 3 comprising a wind turbine blade in a tilted position, as seen from the side, FIG. 7 illustrates an embodiment of a vehicle comprising a truck pulling a transporter mounted with a blade in a raised position, as seen from the side, FIG. 8 illustrates an embodiment of a vehicle comprising a truck pulling a transporter mounted with a blade in a substantially horizontal position, as seen from the side.

DETAILED DESCRIPTION OF THE PRESENTLY PREFERRED EMBODIMENTS-

Figure 1:
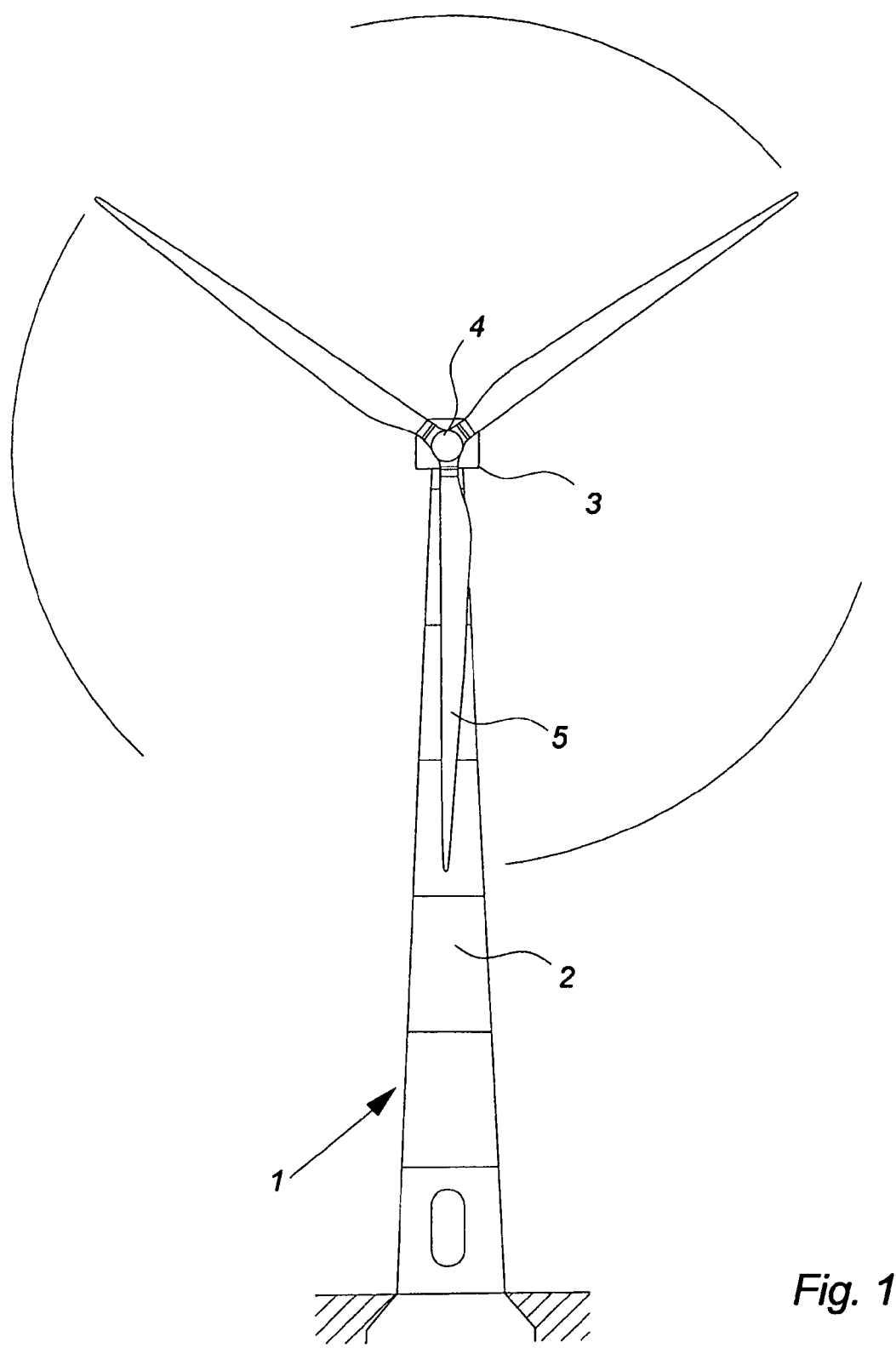
FIG. 1 illustrates a large modern wind turbine known in the art, as seen from the front.

FIG. 1 illustrates a wind turbine 1 known in the art, comprising a tapered tower 2, which is subdivided into a number of tower sections. A wind turbine nacelle 3 is positioned on top of the tower 2.

The wind turbine rotor 4, comprising a number of wind turbine blades 5, is connected to the nacelle 3 through the low speed shaft which extends out of the nacelle 3 front.

Figure 2:
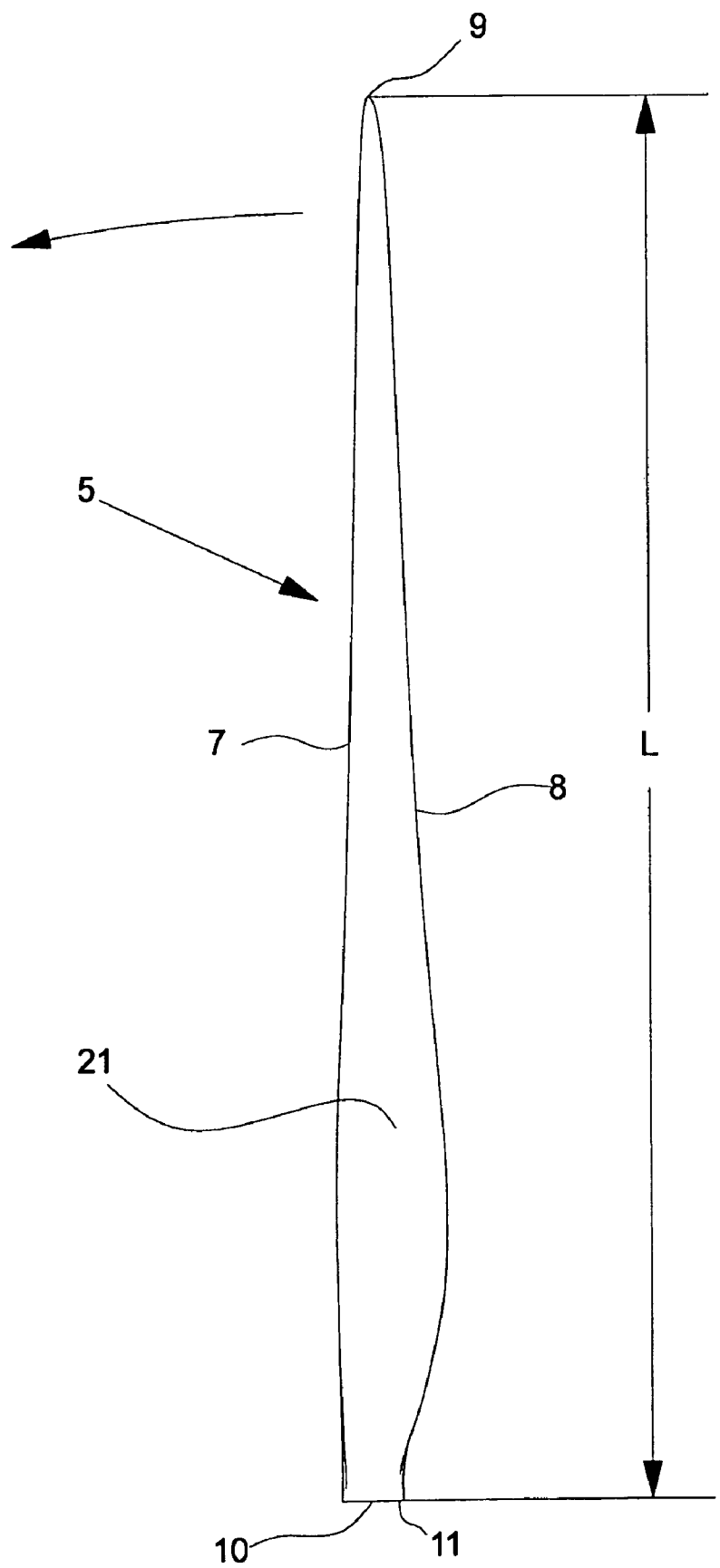
FIG. 2 illustrates a wind turbine blade, as seen from the front.

FIG. 2 illustrates a wind turbine blade 5, as seen from the front. The wind turbine blade 5 comprises a leading edge 7, a trailing edge 8, a tip end 9 and a root end 10. The two sides 20, 21 of the blade 5, which extends between the leading edge 7 and the trailing edge 8, are usually referred to as the leeward side 20 and the pressure side 21. In this embodiment the pressure side 21 is the visible side.

The blade 5 is typically hollow, except for one or more strengthening members extending substantially the entire length of the blade 5. A wind turbine blade 5 known in the art is typically made of a glass fibre and resin composite reinforced by carbon fibre, carbon fibre reinforced wood or a combination hereof.

The root 10 of the blade is typically provided with a mounting flange 11 comprising a number of embedded threaded sockets for attaching the blade 5 to the rotor hub by means of bolts.

The arrow indicates the direction of rotation during normal operation when the blade 5 is mounted on a wind turbine 1. The length L of the blade 5 is on traditional modern wind turbine blades 5 between 30 meters and 60 meters and the weight is between 8 tons and 20 tons.

FIG. 3 illustrates an embodiment of a vehicle 6 comprising a wind turbine blade 5 in a substantially horizontal position, as seen from the side.

In this embodiment of the invention the first end 24 of a blade 5 is attached to a vehicle 6 in form of a self-propelled transporter 12 by connecting the mounting flange 11 at the root end 10 of the blade 5 to blade connection means 14 by means of bolts (not shown).

In this embodiment the blade connection means 14 comprise a connection frame 15 comprising a number of holes 28 corresponding to the threaded sockets embedded in the mounting flange 11 of the blade 5. In another embodiment the blade connection means 14 could be formed as a plate or it could be designed more complexly e.g. in form of a frame comprising latticework.

In this embodiment of the invention the blade 5 is only suspended by the connection frame 15 on the blade connection means 14 but in another embodiment the vehicle could further comprise one or more supports (not shown) for supporting the blade 5 e.g. at the middle, when the blade 5—as shown—is in substantially horizontal position.

In this embodiment the blade is mounted with the pressure side 21 facing down and the leeward side 20 facing up but in another embodiment it could be the pressure side facing up or either the trailing edge 8 or the leading edge 7 could face upwards.

In this embodiment of the invention the vehicle 6 is only provided with one blade 5, but in another embodiment the vehicle 6 could comprise more blades 6 e.g. two blades 6 both attached at the root end 10 to connection means 14 comprising tilting means 19 on the vehicle 6 with the opposite ends 25 pointing in the same or opposite directions.

FIG. 4 illustrates the same embodiment of a vehicle 6 as illustrated in FIG. 3 comprising a wind turbine blade 5 in a tilted position, as seen from the side.

The blade connection means 14 does in this embodiment comprise tilting means 19, in that the connection frame 15 is rotatably mounted on the vehicles load carrying structure 16 providing a centre of rotation 18 at a rotary joint on each side of the connection frame 15 and in that one end of two tilting actuators 17 are pivotally connected to the vehicles load carrying structure 16 and the other end of the tilting actuators 17 are pivotally connected to the bottom of the connection frame 15.

To elevate one end 25 of a blade 5 by tilting means at the other end 24 of the blade 5 the tilting means have to be provided with a centre of rotation 18. In this embodiment the centre of rotation is placed close to the middle of the root end 10 of the blade 5, but in another embodiment the centre of rotation 18 could be placed differently such as further up the blade 5, behind the blade 5 or bellow the blade 5.

In this embodiment the tilting actuators 17 are hydraulic cylinders but in another embodiment the tilting means 19 could comprise pneumatic cylinders, motor driven spindle actuators or the tilting of the blade 5 could be preformed by a tackle and/or a winch.

When the tilting means 19 are activated, which in this case means that the hydraulic cylinders starts to retract, the connection means 14 with the attached blade 5 is tilted hereby elevating the opposite free unsuspended end 25 of the blade 5 and making the blade 5 extend in an angle A in relation to a substantially horizontal plane of the vehicle 6. In this embodiment the blade 5 is tilted to an angle A of approximately 45° in relation to the blades 5 substantially horizontal position illustrated in FIG. 3 but in another embodiment the blade could be raised to any angle A between 0° and 90°.

In this embodiment of the invention the speed and the direction of the vehicle and the tilting angle A of the blade 5 is controlled manually by a person operating the vehicle 6. In another embodiment the vehicle 6 could be provided with a control system replacing, assisting or overwriting this manual control at least under certain circumstances. E.g. if strain-gauges mounted on the blade 5, pressure sensors in the hydraulic system of the tilting means 19 or distance sensors mounted on the vehicle detects that the blade 5 is vibrating to a degree, that the deflection of the blade 5 could damage the blade 5 or even tilt the entire vehicle 6, the control system could automatically enforce countermotion in the tilting means to dampen the vibrations.

Radars or other kinds of sensors connected to the control system could also reduce the speed or the direction of the vehicle 6 if the blade 5 or the vehicle 6 was approaching obstacles or the control system could ensure that the vehicle 6 could only move at a certain (low) maximum speed when the blade 5 is raised above a certain angle A.

Figure 5:
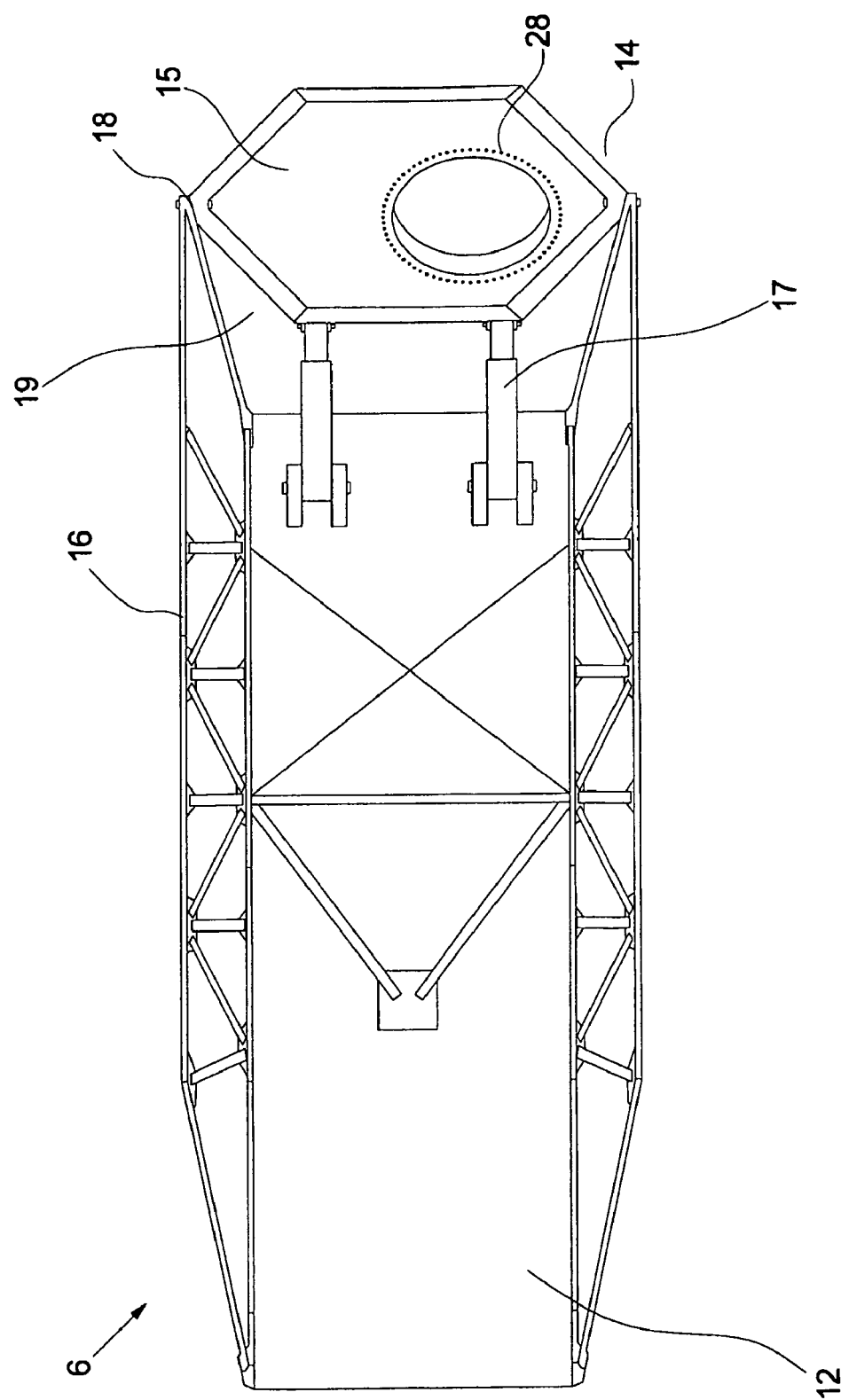
FIG. 5 illustrates an embodiment of a vehicle, as seen from the top.

FIG. 5 illustrates an embodiment of a vehicle 6 without a blade 5 mounted, as seen from the top.

In this embodiment the tilting means 19 comprise two tilting actuators 17 placed substantially symmetrical around a vertical centre plane of the vehicle 6 but in another embodiment the tilting actuators 17 could be placed differently and the tilting means 19 could comprise another number of tilting actuators 17 or the tilting actuators 17 could be replaced or supplemented by a tackle, a winch, one or more counterweights or the like.

In this embodiment the majority of the vehicles load carrying structure 16 are formed as a latticework rigidly connected to a transporter 12, which in this embodiment is self-propelled, but in another embodiment the structure 16 could be solid, it could be formed as parallel beams or it could be designed in another way ensuring that the structure 16 is capable of substantially rigidly carrying the load of the blade 5 and the structures 16 self-weight.

Figure 6:
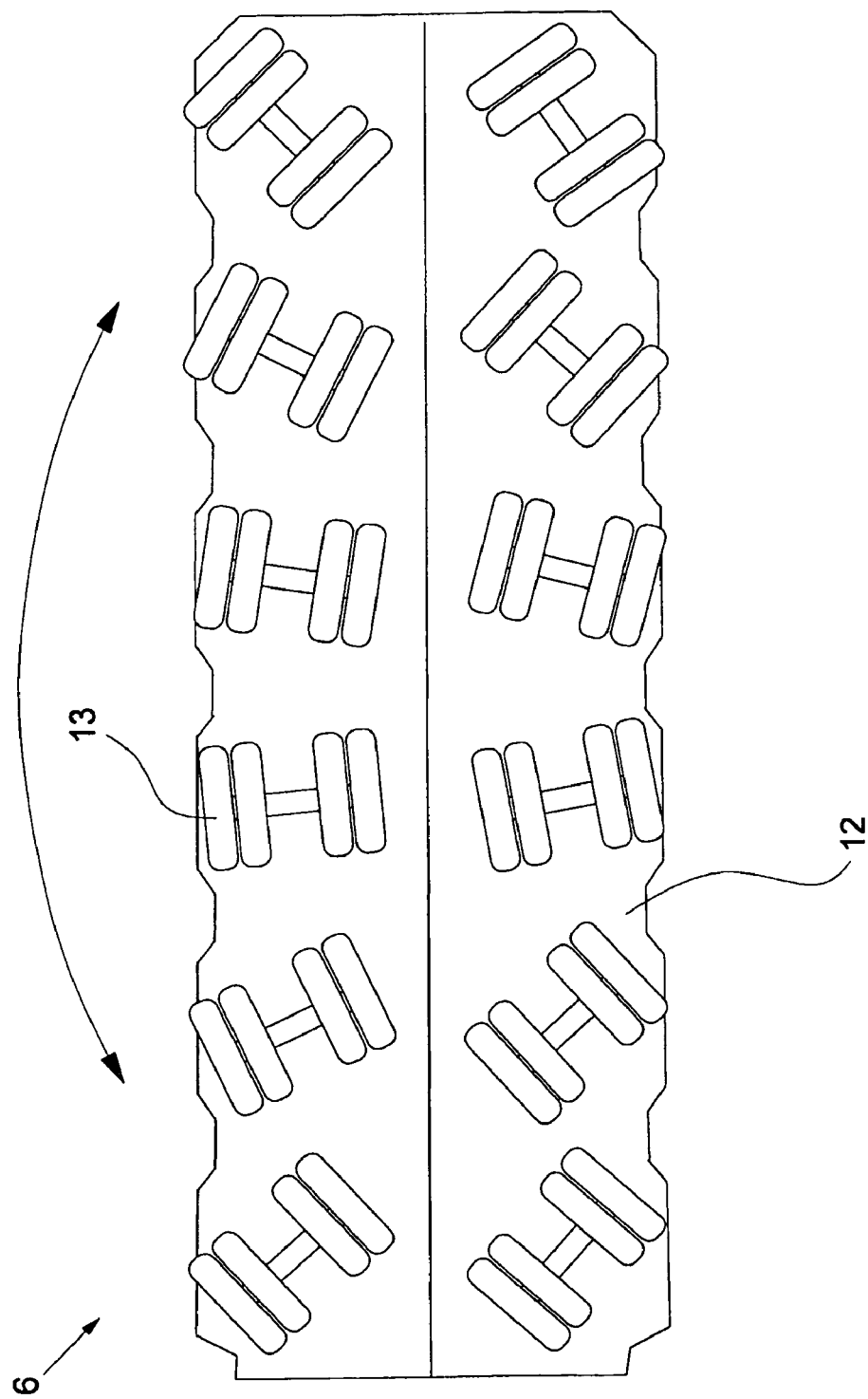
FIG. 6 illustrates an embodiment of a vehicle, as seen from bellow.

FIG. 6 illustrates an embodiment of a vehicle 6, as seen from bellow.

In this embodiment of the invention the bottom part of the vehicle 6 is more or less a standard self-propelled heavy-duty transporter 12 with hydrostatic drive. The self-propelled transporter 12 comprises a number of individually driven and steered wheel sets 13, which through electronic multi-way steering provides a steering angle of +/−110°. This steering is used in individual modules as well as in any large longitudinal or lateral combination, which besides the illustrated carrousel steering provides the steering modes of 90° crab steering, diagonal crab steering and of course normal straight driving.

Furthermore, in this embodiment each of the wheel sets 13 are provided with hydraulic axle suspension which by means of pendular axles are interconnected to hydraulic support circuits. Within these support circuits an equal axle load is achieved. A hydraulic stroke of up to +/−300 mm enables compensation in the vehicles 6 longitudinal and lateral direction and therefore permits operation on uneven terrain as well as adjustment for extreme side tilt (leveling).

FIG. 7 illustrates an embodiment of a vehicle 6 comprising a truck 22 pulling a transporter 12 mounted with a blade 5 in a raised position, as seen from the side.

In this embodiment of the invention the transporter 12 is not provided with means for making it self-propelled and the transporter 12 is therefore connected to a standard truck 22 by means of a relatively long substantially rigid connection rod 23. The truck 22 pulls the non-driven transporter 12 and when passing a sharp bend on the road the blade 5 can be tilted as illustrated hereby making possible to pass the bend, in that the substantially rigid connection rod 23 is pivotally joined to both the truck 22 and the transporter 12.

In another embodiment of the invention the connection rod 23 could also be a hauling rope, a flexible rod, a wagon or a carriage e.g. comprising additional wind turbine 1 equipment or it could e.g. be replaced by a further non-driven transporter 12 e.g. comprising a second blade 5 extending in the opposite direction.

FIG. 8 illustrates an embodiment of a vehicle 6 comprising a truck 22 pulling a transporter 12 mounted with a blade 5 in a substantially horizontal position, as seen from the side.

When the blade 5 is in its initial substantially horizontal position the blade 5 extends over the roof of the truck 22 to reduce the total length of the vehicle 6, making it easier for the vehicle 6 to negotiate road turns. In this embodiment the free tip end 9 of the blade 5 is not connected to or in any way supported by or at the truck 22 to enable free relative horizontal (and to some degree also vertical movement) between the blade 5 and the truck 22.

Figure 9:
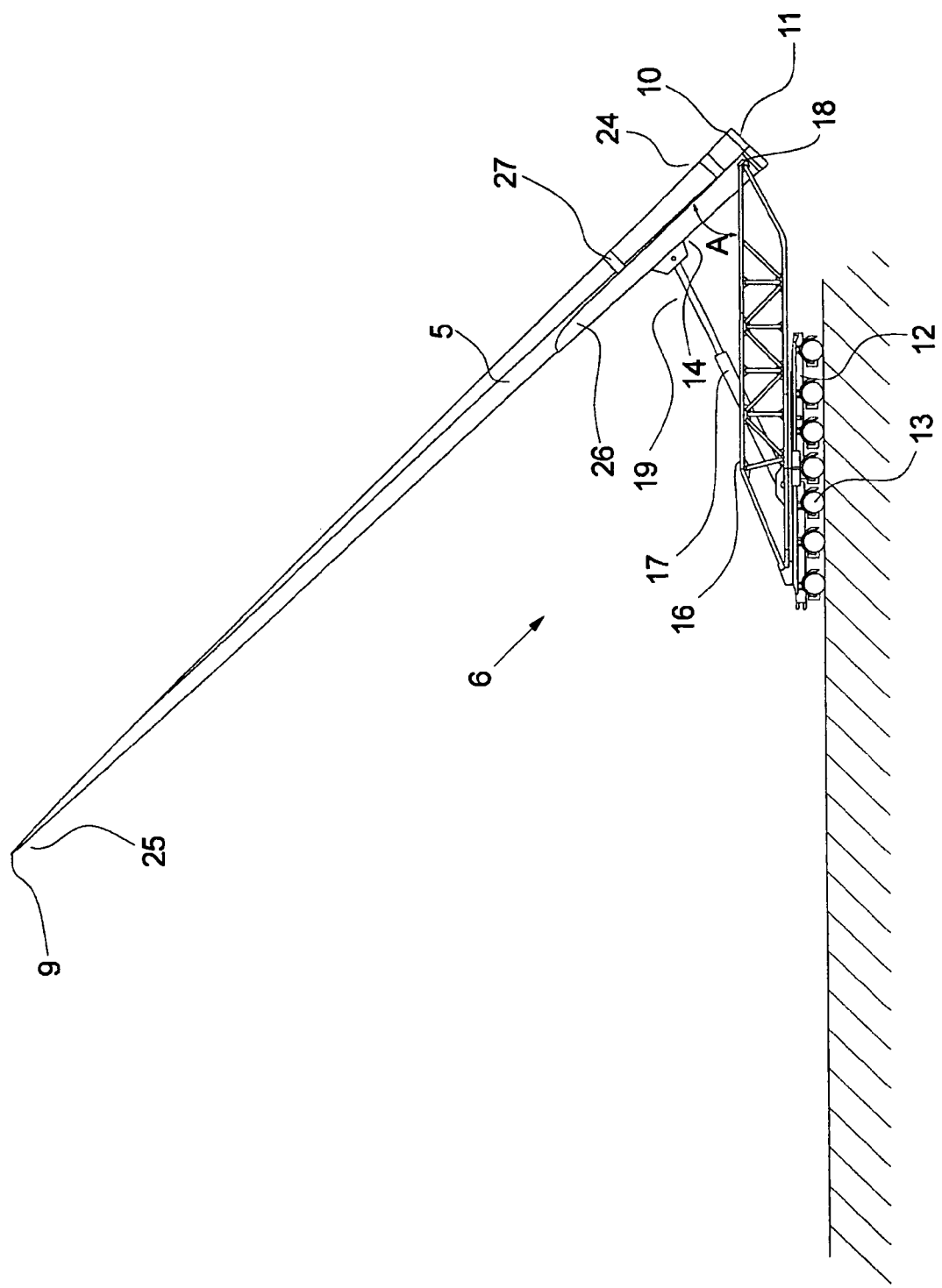
FIG. 9 illustrates an embodiment of a vehicle including another embodiment of blade connection means and tilting means, as seen from the side.

FIG. 9 illustrates an embodiment of a vehicle 6 including another embodiment of blade connection means 14 and tilting means 19, as seen from the side.

In this embodiment of the invention the first end 24 of the blade 5, which in this case is the root end 10, is placed in a supporting cradle 26 of the connection means 14. The cradle 26 being rotatably joined to a load carrying structure 16 of the vehicle 6. Furthermore, a couple of straps are tied across the blade 5 to firmly secure the blade 5 to the connection means 14. Tilting means 19 are provided in form of a hydraulic cylinder acting on the cradle 26, hereby elevating the opposite free end 25 of the blade 5.

In this embodiment of the invention the vehicle 6 on which the blade 5 is attached is a self-propelled transporter 12 but in another embodiment the transporter 12 could be non-driven and pulled by a truck 22 as illustrated in FIGS. 7 and 8.

The embodiments of the invention have been exemplified above with reference to specific examples of vehicles 6, blade connection means 14 and tilting means 19 for use when transporting wind turbine blades 5. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Vehicle
7. Leading edge
8. Trailing edge
9. Tip end
10. Root end
11. Mounting flange
12. Transporter
13. Wheel set
14. Blade connection means
15. Connection frame
16. Load carrying structure of vehicle
17. Tilting actuator
18. Centre of rotation
19. Tilting means
20. Leeward side
21. Pressure side
22. Truck
23. Connection rod
24. First end
25. Opposite end
26. Supporting cradle
27. Strap
28. Hole
L. Length of blade
A. Angle of blade

The invention claimed is:

1. A vehicle for transporting a wind turbine blade comprising a tip end and a root end opposite the tip end, and a mounting flange in the root end, the vehicle comprising:
    blade connection means coupled to the vehicle for connecting to the mounting flange of the wind turbine blade, said blade connection means suspending the wind turbine blade only by its root end when positioned in the vehicle,
    wherein said blade connection means comprises tilting means for elevating the tip end of the wind turbine blade when positioned in the vehicle for transport of the wind turbine blade in a tilted orientation, and
    wherein said blade connection means is arranged such that the tip end of the wind turbine blade when positioned in the vehicle for transport of the wind turbine blade is orientated in a forward direction of the vehicle.

2. The vehicle according to claim 1, wherein the wind turbine blade comprises a number of threaded sockets embedded in the mounting flange of the wind turbine blade for use when mounting the wind turbine blade on a wind turbine hub by means of bolts, and wherein the blade connection means comprises a connection frame comprising a number of holes corresponding to the threaded sockets of the wind turbine blade.

3. The vehicle according to claim 1, further comprising leveling means.

4. The vehicle according to claim 1, wherein the vehicle is self-propelled.

5. The vehicle according to claim 1, wherein the vehicle comprises steering means for steering the vehicle.

6. The vehicle according to claim 1, wherein the wind turbine blade is connected to said blade connection means by way of a plurality of bolts.

7. The vehicle according to claim 1, wherein said blade connection means comprise means for attaching the wind turbine blade with a pressure side or a leeward side of the wind turbine blade facing down.

8. The vehicle according to claim 1, wherein a center of rotation of said tilting means is placed at the root end of the wind turbine blade when positioned in the vehicle.

9. A control system for controlling the tilting means of a vehicle according to claim 1, wherein said tilting means is controlled in response to a sensor input from the vehicle.

10. The vehicle according to claim 1, wherein the tilting means is operable to move the wind turbine blade between a first tilted orientation and a second tilted orientation, the tilting means configured such that the wind turbine blade may be transported by the vehicle while in each orientation.

11. The vehicle according to claim 10, wherein the tilting means is operable to move the wind turbine blade between the first and second tilted orientations while the wind turbine blade is positioned on the vehicle and the vehicle is in motion.

12. The vehicle according to claim 1, further comprising a load carrying structure configured to rigidly carry the load of the wind turbine blade and the weight of the load carrying structure, and wherein said blade connection means comprises a connection frame mounted to said load carrying structure.

13. The vehicle according to claim 12, wherein said connection frame is rotatably mounted to said load carrying structure.

14. The vehicle according to claim 1, wherein said tilting means comprise one or more tilting actuators, each tilting actuator comprising one or more hydraulic cylinders.

15. The vehicle according to claim 14, wherein said hydraulic cylinders are configured to retract to tilt the wind turbine blade.

16. The vehicle according to claim 15, wherein said tilting means comprises a hydraulic cylinder configured to act on said cradle to tilt the wind turbine blade.

17. The vehicle according to claim 1, wherein said tilting means is capable of tilting the wind turbine blade when positioned in the vehicle in an angle (A) of between 0° and 90.

18. The vehicle according to claim 17, wherein said angle (A) is between 0° and 70°.

19. The vehicle according to claim 17, wherein said angle (A) is between 0° and 50°.

20. A method for transporting at least one wind turbine blade on a vehicle, the wind turbine blade comprising a tip end and a root end opposite the tip end, and a mounting flange in the root end, the method comprising:

connecting the mounting flange of the wind turbine blade to the vehicle by blade connection means, thereby suspending the wind turbine blade;

transporting the wind turbine blade on the vehicle;

elevating the tip end opposite the root end of the wind turbine blade to a first tilted orientation by tilting means of the blade connection means; and transporting the wind turbine blade on the vehicle in the first tilted orientation arrived at by means of the elevating step.

21. The method according to claim 20, further comprising the step of leveling the vehicle when the vehicle travels over uneven terrain.

22. The method according to claim 20, wherein the vehicle comprises a hydraulic axle suspension having pendular axles interconnected to hydraulic support circuits, and wherein the vehicle is leveled by maintaining an equal axle load.

23. The method according to claim 20, further comprising:
further elevating the tip end in order to further tilt the wind turbine blade from the first tilted orientation to a second tilted orientation; and transporting the wind turbine blade on the vehicle in the second tilted orientation arrived at by means of the further elevating step.

24. The method according to claim 20, wherein the wind turbine blade further comprises a pressure side and a leeward side, and wherein in the step of connecting the mounting flange of the wind turbine blade to the vehicle, one of the pressure side and the leeward side of the wind turbine blade faces down.

25. A vehicle for transporting a wind turbine blade comprising a tip end and a root end opposite the tip end, and a mounting flange in the root end, the vehicle comprising:

a blade connector coupled to the vehicle for connecting to the mounting flange of the wind turbine blade, thereby suspending the wind turbine blade only by its root end when positioned in the vehicle, wherein said blade connector comprises a tilting device for elevating the tip end of the wind turbine blade when positioned in the vehicle for transport of the wind turbine blade in a tilted orientation, and wherein said blade connector is arranged such that the tip end of the wind turbine blade when positioned in the vehicle for transport of the wind turbine blade is orientated in a forward direction of the vehicle.

* * * * *